United States Patent [19]

Lanson et al.

[11] 3,886,559

[45] May 27, 1975

[54] REMOTELY OPERATED TV RECEIVER ANTENNAE

[75] Inventors: Frank Lanson, Woodbury; Milton Spirt, Jamaica Estates, both of N.Y.

[73] Assignee: Milton Spirt, Jamaica Estates, N.Y.

[22] Filed: Mar. 14, 1974

[21] Appl. No.: 451,283

Related U.S. Application Data

[63] Continuation-in-part of Ser. No. 426,555, Dec. 20, 1973, abandoned.

[52] U.S. Cl. .................. 343/726; 343/758; 343/766
[51] Int. Cl. .............................................. H01q 3/00
[58] Field of Search ............ 343/758, 763, 766, 726

[56] References Cited

UNITED STATES PATENTS

| | | | |
|---|---|---|---|
| 3,040,318 | 6/1962 | Lang et al. | 343/766 |
| 3,041,609 | 6/1962 | Rathenau | 343/766 |
| 3,478,361 | 11/1969 | Middlemark | 343/742 |
| 3,739,388 | 6/1973 | Callaghan | 343/726 |

*Primary Examiner*—Eli Lieberman
*Attorney, Agent, or Firm*—Flynn & Frishauf

[57] ABSTRACT

An arrangement in which the antenna for a TV receiver may be oriented to an optimum position by the viewer from a remotely-located position from the receiver. Antennas for VHF and UHF are each linked to rotary gears driven by a motor. Operation of the motor is controlled by the viewer by a remotely-located switch. The switch is held in depressed position to rotate the antennas by the motor to an optimum position in which the picture displayed by the picture tube of the TV receiver, is sharpest and possesses the greatest definition.

13 Claims, 4 Drawing Figures

REMOTELY OPERATED TV RECEIVER ANTENNAE

This is a continuation-in-part of application Serial No. 426,555 filed December 20, 1973, now abandoned.

BACKGROUND OF THE INVENTION

In the use of antennas in conjunction with TV receivers, optimum reception of the picture displayed by the picture tube occurs at a predetermined position of the antenna. This optimum position of the antenna is not always well defined for the viewer, and considerable manipulation of the antenna is often required to find the optimum angle of rotation of the antenna.

Heretofore, the rotary positioning of the antenna has been accomplished by manual means. Thus, in adjusting the rotary position of antennae for TV receivers, in the past, the viewer was required to stand adjacent to the antenna and to either grasp the antenna directly for the purpose of rotating the antenna or rotating a knob which is mechanically linked to the antenna so that rotation of the knob results in simultaneous rotation of the antenna.

The requirements of having the viewer stand adjacent to the antenna while attempting to locate the optimum rotary position for the antenna, in the past, has not provided satisfactory results because the viewer would, thereby, normally stand next to the TV receiver and thereby alter the electromagnetic characteristics of the receiver circuits while performing the antenna adjustments.

Accordingly, if the viewer were to finally manually rotate the antenna to a position where he would see optimum reception by the TV receiver, such optimum reception would then decay when the viewer walked away from the TV receiver to a position remote therefrom for the purpose of sitting down, for example in front of the receiver to view the picture tube. Thus, when the viewer changed the distance between himself and the TV receiver, the reception characteristics became modified, so that the optimum position for the antenna when the viewer stands close to the TV receiver, does not coincide with the optimum position for the TV antenna when the viewer is seated, for example, a substantial distance away from the receiver.

The alternation or modification of the electromagnetic characteristics of the receiver circuits as a function of the position of the viewer relative to the TV receiver, has caused in the past frustration of the viewer in moving back and forth between the TV receiver and a remotely-located position in which the viewer wishes to be seated for watching the picture tube.

It is therefore an object of the present invention to provide an arrangement for remote positioning of a TV receiver antenna by a viewer.

Another object of the present invention is to provide a remote positioning arrangement for TV receiver antennae in which the antennae may be rotated by electrical means operated from a position located remotely from theh receiver.

A still further object of the present invention is to provide an arrangement for remotely positioning TV receiver antennae in which rotation of the antennas is automatically reversed at a predetermined angular orientation.

A yet further object of the present invention is to provide an arrangement of the foregoing character in which TV receiver antennae for VHF and UHF are simultaneously rotated, the simultaneous rotation being at different rates and/or in opposite directions.

It is a further object of the present invention to provide an arrangement, as described which is simple in design and construction, and which is highly reliable and easily maintained.

SUMMARY OF THE INVENTION

According to the present invention, an arrangement for controlling the positioning of an antenna, for example a TV receiver, includes a housing having a pair of rotary members supported thereon and rotatable relative to the housing and to each other, the rotary members each carrying an antenna. The rotary members are respectively coupled to a ring and a spur gear which are concentrically oriented. An electrical motor has an output shaft which is coupled to a pinion gear which simultaneously meshes with the ring and spur gears for rotating the rotary members when the motor is energized. Switching means is remotely located from the housing and is connected to the motor for remotely controlling the operation of the motor, thereby remotely controlling the positioning of the antennae relative to the housing.

The above objects and features of the present invention, together with additional objects and advantages thereof will become apparent from the following description taken in conjunction with the accompanying drawings.

DESCRIPTION OF THE PREFERRED EMBODIMENTS

Figure 3:
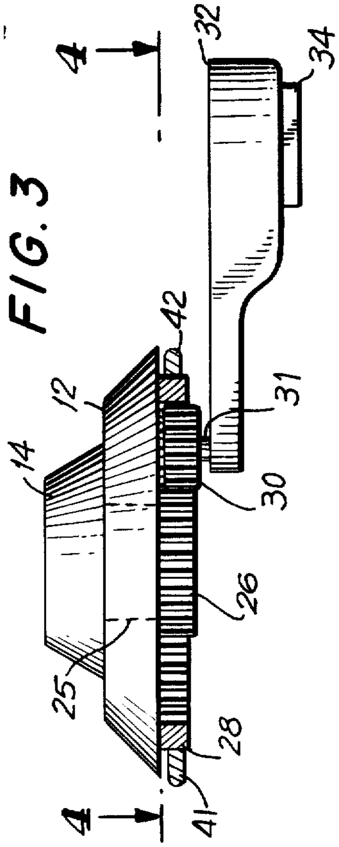
FIG. 3 is a side view and shows the mechanical linkage of the driving mechanism for rotating the antennae in FIG. 1.

Referring to the drawing, a housing cabinet 10 supports two rotary members 12 and 14. The rotary members 12 and 14 are linked in a manner which allows them to rotate in opposite directions. The rotary member 12 carries an antenna 16 for VHF reception, for example. The rotary member 14, on thhe other hand, carries an antenna 18 for UHF reception, together with a reflector plate 20. One rotatable knob 22 on the cabinet housing is coupled to a switch (not shown) which permits switching antennae, as desired, for purposes of operating the TV receiver under either VHF or UHF conditions. Thus, if VHF receiption is desired, then the appropriate antenna selection is made by rotating the knob 22 to a predetermined position. A second control knob 24 may be provided, as desired, for purposes of further enhancing the reception by switching, for example, known electrical circuits, not shown. The antennae 16 and 18 are connected to a TV receiver through the switch and enhancing circuits in a conventional manner which is not shown.

Figure 4:
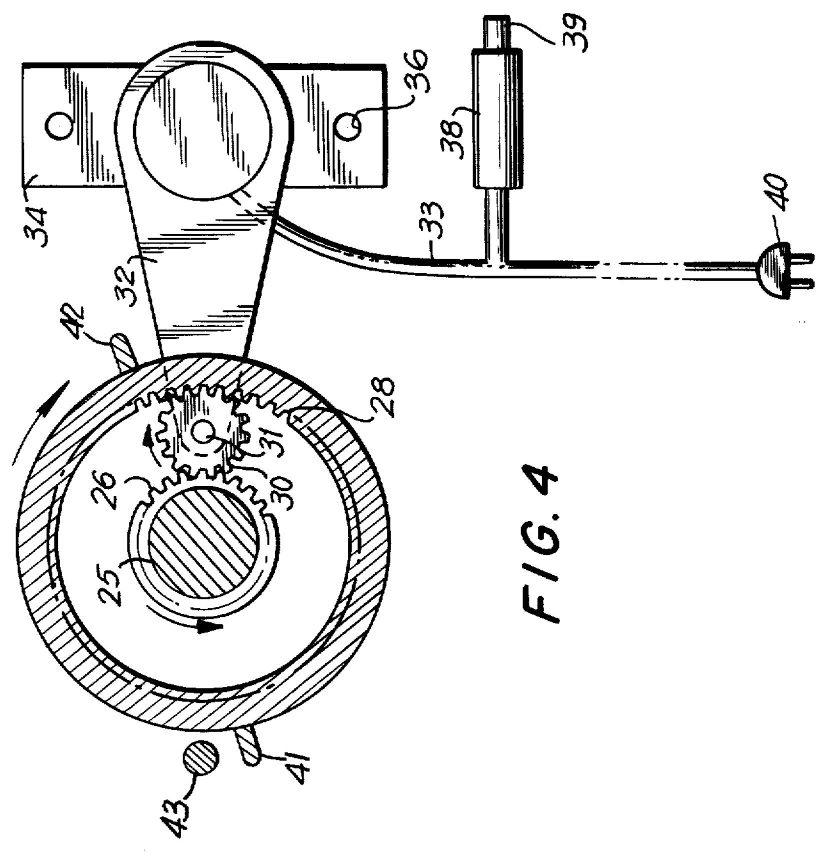
FIG. 4 is a plan view taken along line 4—4 in FIG. 3.
Figure 1:
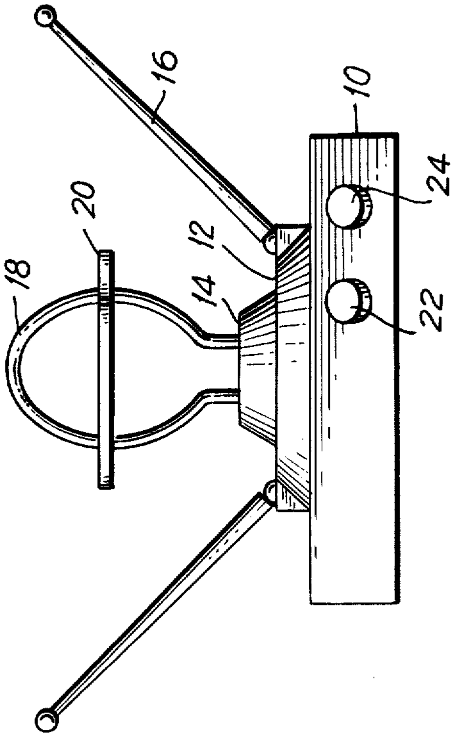
FIG. 1 is a front elevational view of a TV receiver antenna arrangement in which the antennae may be oriented to optimum positions, in accordance with the present invention.
Figure 2:
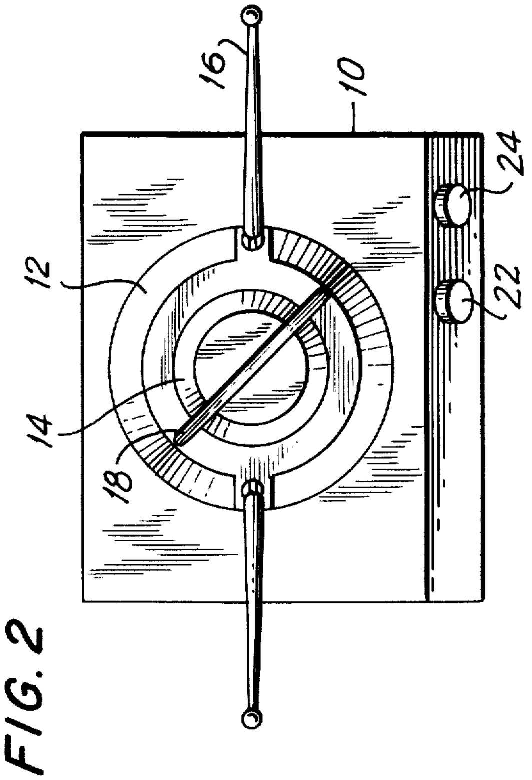
FIG. 2 is a plan view of the arrangement of FIG. 1.

As shown in FIGS. 3 and 4, the rotary member 14 is attached to a spur gear 26 provided with external teeth. The rotary member 12, on the other hand, is attached to a ring gear 28 provided with internal teeth. The rotary members 12 and 14 are mounted concentrically on the cabinet housing 10. As a result, the gears 26 and 28 rotate concentrically relative to each other. The spur gear 26 is made substantially smaller in its pitch diameter, than the ring gear 28.

Within the space between the external teeth of spur gear 26 and the internal teeth of ring gear 28, is a driving pinion 30 provided with external teeth. The pitch diameters of the spur gear 26 and the ring gear 28 are such that the pinion gear 30 meshes simultaneously with the external teeth of spur gear 26 and internal teeth of ring gear 28. The spur gear 26 may be attached to the rotary member 14 by means of an extension 25 of the rotary member 14, for example, for purposes of bringing the plane of the spur gear 26 into the operative plane of the ring gear 28.

The pinion gear 30 is mechanically attached to the output shaft of a motor 32. This motor 32 is mounted by means of bracket 34, to the underside of the top wall of the cabinet housing 10. Thus, by means of passing screws or bolts through opening 36 in the bracket 34, the motor may be mounted within the interior of the cabinet housing 10, and attached to the lower side of the top wall of this housing. The rotary output motion of the motor 32 is derived from the shaft 31 which is attached to the pinion gear 30.

One of the electrical terminals or leads of the motor 32 is connected directly to a utility power supply means of a conventional electrical plug 40. The other electrical lead or terminal of the motor 32 is designated by the reference numeral 33, and this lead is connected to the conventional electrical plug 40 by way of an electrical operating switch 38. Thus, the switch 38 interrupts or closes the circuit through the lead 33, as desired.

The electrical switch 38 is a push-button type of switch having a substantially elongated housing which enables the viewer to hold theh switch comfortably in his hand. The switch 38 may be actuated by depressing the push button 39. When this push button 39 is depressed, the electrical circuit to the motor 32 is closed, and the motor commences to operate.

The motor 32 is arranged so that whenever the push button 39 is depressed, there is substantial likelihood that the motor will operate in a direction which is the reverse of the direction in which it previously operated. Thus, the rotational direction of the motor can generally be reversed whenever the push button 39 is depressed. The construction of such an electrical motor having these characteristics is fully disclosed in U.S. Pat. No. 3,121,815, issued Feb. 18, 1964 to P.A. Sidell and will, for this reason, not be described further herein.

Whenever the motor 32 rotates in one direction or another, the pinion 30 will rotate in a corresponding direction, and will thereby drive both the spur gear 26 and ring gear 28. When the pinion 30 rotates in a clockwise direction, for example, as shown by the arrow in FIG. 4, then the ring gear 28 also rotates in clockwise direction. The spur gear 26, however, rotates thereby in counterclockwise direction. Accordingly, by the rotation of the pinion 30 in a given direction, the spur gear 26 rotates in opposite direction relative to the ring gear 28.

Therefore, upon rotation of the pinion gear 30 in one direction or another, the gears 26 and 28 will rotate relative to each other in opposite directions, so that the antennae 16 and 18 are also rotated in opposite directions relative to each other. The provision for such opposite rotation for the antennae 16 and 18 has a pleasant effect upon the viewer. Further, in the preferred embodiment the VHF antenna 16 and the UHF antenna 18 are rotated at different rates of speed. In a typical arrangement the antennae 16 and 18 are geared down by 4 : 1 and 6 : 1, respectively so that the antenna 16 rotates more slowly than the antenna 18. By virtue of this relative movement between antennae 16 and 18, the reflector plate 20 of antenna 18 will have a variable electromagnetic effect with the antenna 16 during rotation. It has been found that this interaction may improve reception of VHF signals. This effect, plus the pleasant effect upon the viewer, when the antennae are rotated oppositely is particularly desirable.

The electrical motor 32 as described in the aforementioned U.S. Pat. No. 3,121,815, also has the characteristic that whenever a stopping or breaking torque of a predetermined value (which is relatively small) is applied to its output shaft, rotation of the output shaft is automatically reversed. This characteristic is advantageously used in the present invention since it is only necessary that the antenna 16 be rotated by about 180°. This limitation also simplifies the electrical connections leading from the antennae. As shown in FIGS. 3 and 4, the ring gear 28 has ears or tabs 41, 42 projecting outwardly therefrom and the housing 10 has a stop member 43 extending therefrom. During operation of the motor upon depression of switch button 39, the ring gear 28 will eventually turn to a position where one of the tabs 41, 42 contacts stop member 43 to prevent further rotation of the gears and apply a stopping torque to the motor. The motor, as described above, will then reverse its direction of rotation, automatically, to reverse the direction of rotation of the antennae. Alternatively, tabs 41, 42 may be provided on the housing and stop member 43 on the ring gear 28.

Thus, when the viewer continues to depress the push button 39 on the switch 38, so that the circuit to the motor 32 remains closed for an extended period of time, the motor 32 will continue to operate and rotate the pinion 30 in a substantially continuous manner, but a reversal of rotation will be obtained whenever the antennae will have rotated through an angle of 180°, the rotational angle being dependent upon the relative positions of the tabs 41, 42. Such reversal in rotation of the antennas, in an automatic manner, is also a novel feature of the present invention from the functional viewpoint as well as providing a pleasant effect for the viewer. It should be clear that under various conditions, angles other than 180° may be chosen for reversal of the motor.

The "motor reversal" feature of the present invention has another important advantage. When, for example, during rotation of the antennae, an element such as one of the dipoles of antenna 16 strikes a foreign object, such as a lamp, the force applied by the foreign object (i.e., the lamp) is a sufficient stopping force to cause the motor 32 to reverse direction, thereby reversing the direction of rotation of the antennae and preventing damage to the foreign object (i.e., the lamp). This is an important safety feature.

It will be understood that each of the elements described above, or two or more together, may also find a useful application in other types of antenna positioning arrangements differing from the types described above.

While the invention has been illustrated and described as embodied in antenna positioning arrangements, it is not intended to be limited to the details shown, since various modifications and structural changes may be made without departing in any way from the spirit and scope of the present invention as defined in the appended claims.

We claim:

1. An arrangement for controlling the positioning of antenna, comprising:

- a supporting housing;
- a first rotary member supported by said housing and being rotatable with respect to said housing, said first rotary member carrying a first antenna;
- a second rotary member rotatable supported on said housing and carrying a second antenna, said second rotary member being substantially concentric with said first rotary member;
- a ring gear with internal teeth coupled to said first rotary member;
- a spur gear with external teeth coupled to said second rotary member, said ring gear and said spur gear being concentrically rotatable relative to each other;
- a pinion gear meshing simultaneously with said spur gear and said ring gear;
- an electrical motor with an output shaft drivingly coupled to said pinion gear for rotating said pinion gear when energized, said spur gear rotating in a direction opposite to the direction of rotation of said ring gear when said pinion gear is rotatably driven by said electrical motor so as to rotate said first and second rotary members in opposite directions relative to each other; and
- switching means remotely located from said housing and connected to said motor for remotely controlling the operation of said motor and thereby controlling remotely the positioning of said antennae.

2. The arrangement as defined in claim 1 wherein said ring, spur and pinion gears are arranged such that said second rotary member rotates at a higher rate of speed than said first rotary member, thereby causing said second antenna to rotate at a higher rate of speed than said first antenna.

3. The arrangement as defined in claim 1 introducing means for causing said electrical motor to reverse direction of rotation when said first rotary member, and consequently said first antenna, has rotated through a predetermined angle.

4. The arrangement as defined in claim 3 wherein said predetermined angle comprises substantially 180°.

5. The arrangement as defined in claim 3 wherein said reversing means includes stop means coupled to a least one of said rotary members for interfering with rotation thereof, said motor including means for reversing the rotational direction thereof when a stopping force of a predetermined value is applied to the output shaft thereof through said at least one rotary member.

6. The arrangement as defined in claim 3 wherein said reversing means includes stop means coupled to at least one of said gears for interfering with rotation thereof, said motor including means for reversing the rotational direction thereof when a stopping force of a predetermined value is applied to the output shaft thereof through said at least one of said gears.

7. The arrangement as defined in claim 6 wherein said stop means include a pair of stop members extending from said ring gear, and a cooperating member fixedly mounted relative to said ring gear and against which said stop members abut to stop rotation of said ring gear.

8. The arrangement as defined in claim 7 wherein said cooperating member is a projection extending from said supporting housing.

9. The arrangement as defined in claim 7 comprising one cooperating member and a pair of stop members projecting from said ring gear and substantially diametrically opposed relative to said ring gear to cause reversing of direction of rotation of said motor whenever said ring gear has rotated through an angle of substantially 180°.

10. The arrangement as defined in claim 1 wherein said antenna carried by said rotary member is for VHF TV receiver operation and said second antenna carried by said second rotary member is for UHF operation.

11. The arrangement as defined in claim 10 including switching means on said supporting housing for switching the operation of the antennas selectively between VHF and UHF operation.

12. The arrangement as defined in claim 1 wherein said motor includes means for reversing the direction of the output shaft thereof when a stopping force of a predetermined value is applied to said output shaft by said antenna abutting against a fixed, foreign object.

13. The arrangement as defined in claim 1 wherein said motor includes means for causing the reversal of direction of rotation of the output shaft thereof for substantially every alternate operation of said switching means.

* * * * *